Dec. 31, 1963   L. PÉRAS   3,115,953
LINK-MOUNTED DISC BRAKES
Filed Oct. 18, 1960   3 Sheets-Sheet 1
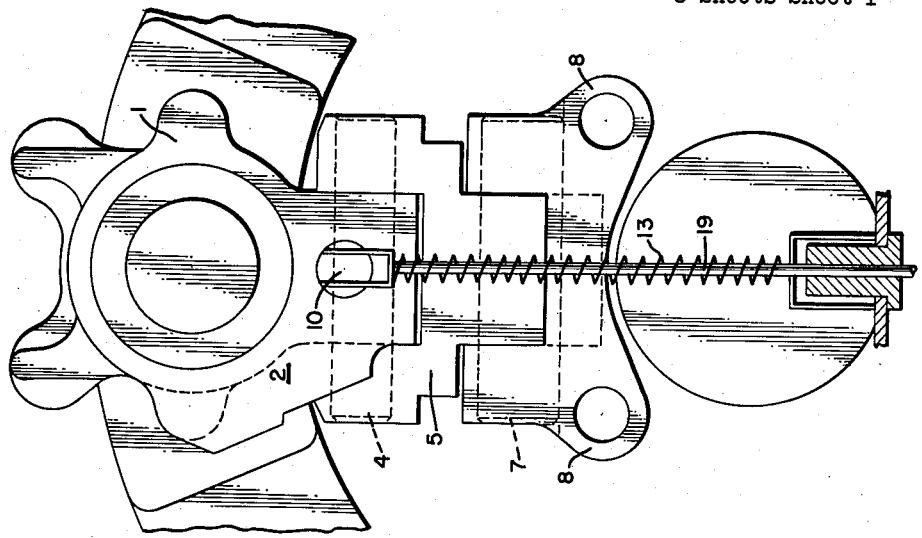
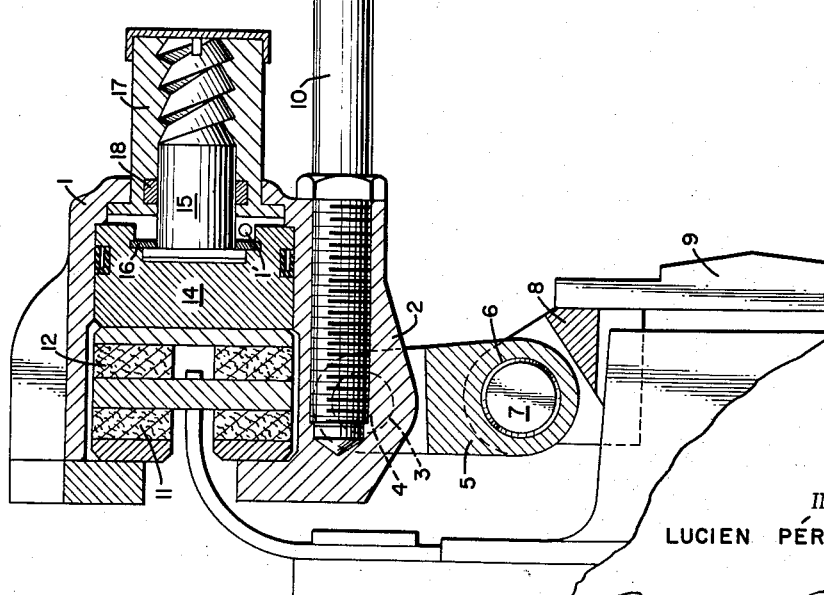
INVENTOR
LUCIEN PÉRAS
BY Robert E. Burns
ATTORNEY Dec. 31, 1963   L. PÉRAS   3,115,953
LINK-MOUNTED DISC BRAKES
Filed Oct. 18, 1960   3 Sheets-Sheet 2

INVENTOR
LUCIEN PERAS
BY Robert E Burns
ATTORNEY

Dec. 31, 1963  L. PÉRAS  3,115,953
LINK-MOUNTED DISC BRAKES
Filed Oct. 18, 1960  3 Sheets-Sheet 3

INVENTOR
LUCIEN PERAS
BY Robert E. Burns
ATTORNEY

United States Patent Office 3,115,953
Patented Dec. 31, 1963

3,115,953
LINK-MOUNTED DISC BRAKES
Lucien Péras, Billancourt, France, assignor to Regie Nationale des Usines Renault, Billancourt, France
Filed Oct. 18, 1960, Ser. No. 63,353
Claims priority, application France Oct. 21, 1959
8 Claims. (Cl. 188—73)

The invention relates to an improvement to disc brakes in which the disc of annular shape is fixed, through its mean periphery, to a support integral with the wheel, two linings arranged one above the other being provided on either side of the disc and the linings as a whole being displaced together by an actuating cylinder which is carried by a non-rotating support and which is located on the side opposite the disc support.

The invention relates in particular to the method of connection which is provided between the block of the braking device and its non-rotating support and which consists in joining that block to its support through the medium of a mobile connecting piece having fulcrum pins on the block and the support, said fulcrum pins being arranged parallel to each other in a plane which is substantially that of the disc. This connecting method offers the following advantages:

(1) Greater freedom of movement for the brake block; the latter is able to follow any deformations of the disc, be it as the result of warping or conical deformation which set in permanently or accidentally as the result of shocks or during turns, in contradistinction to the sliding or parallelogram type guiding systems resorted to hitherto which do not allow the brake block to be displaced other than parallel to itself.

(2) the possibility thereby of adopting smaller clearances between the linings and the disc and consequently shortening the travel of the brake pedal.

(3) The possibility of arranging the brake block in any sector of the wheel and not just over a horizontal radius thereof to protect it from large deformations of the disc.

(4) The possibility of adapting a simpler mechanical braking system comprising fewer mechanical parts.

The invention further has for its object a special arrangement whereby the bottom lining on the same side as the disc support is fixed to the coupling member and not directly to the brake block, this coupling member comprising two parallel fulcrum pins located substantially in the plane of the disc, one serving as an articulation between that member and the actuator block, the other as an articulation between the coupling member and the non-rotating support of the wheel.

This special layout offers the following advantages:

(1) Greater facility of production and increased resistance to deformation;

(2) More extensive dismantling possibilities, such dismantling being carried out, after removing the outside lining located on the same side as the disc support, by swivelling the actuator block about its fulcrum pin, thus enabling the linings on the side remote from the disc-fixing components to be removed, and by swivelling the supporting member in the opposite direction about the fulcrum pin common also to the non-rotating wheel-support, thus making it possible to remove the inner lining located on the same side as the disc support.

The description which follows, with reference to the accompanying drawings, of an embodiment of the invention given by way of example only, will provide a clear understanding of how the invention may be performed.

In the drawings, FIGURE 1 is a cross-sectional view of the brake device;

FIGURE 2 is a front view thereof;

Figure 3:
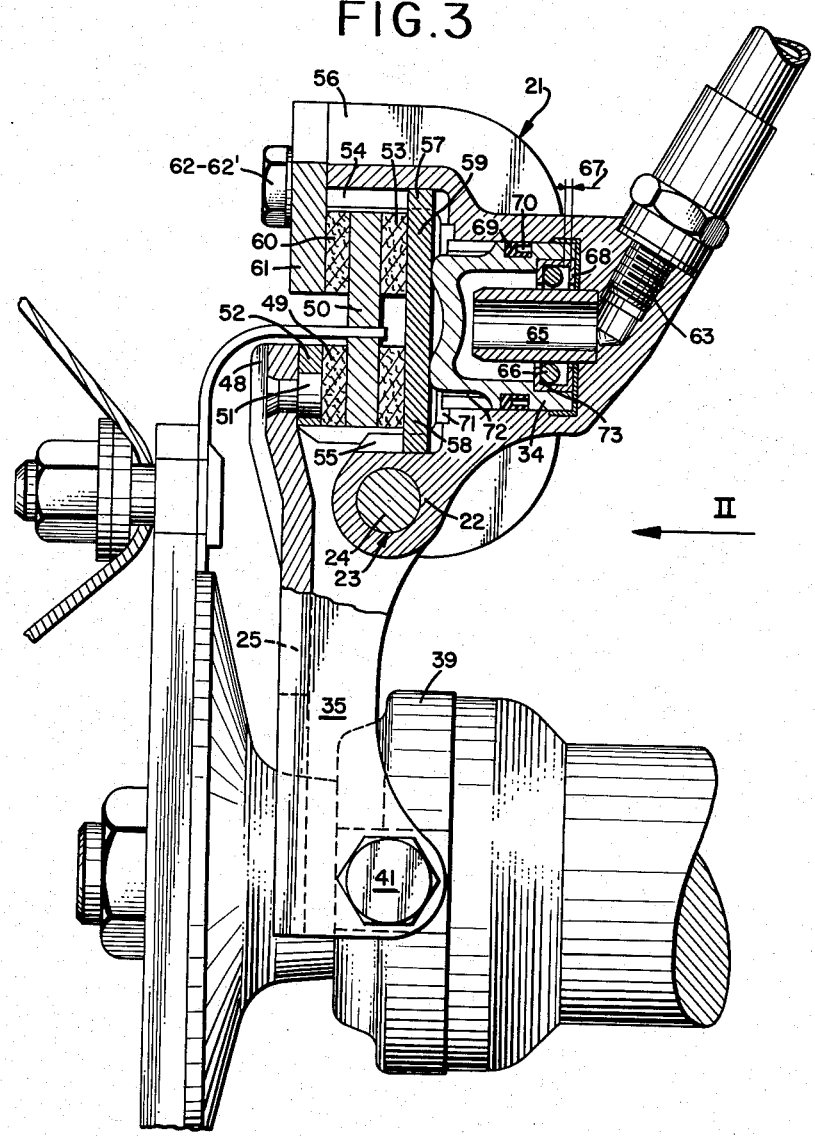
FIGURE 3 is a view in elevation, in partially sectioned form, of a brake in accordance with the invention.

In accordance with the invention, the part acting as the actuator cylinder is joined to a non-rotating support such as the wheel stub axle through the medium of a link or small connecting rod having two parallel articulation pins of which one is integral with the body of the cylinder and the other integral with the non-rotating support of the wheel, the support being itself joined to the chassis through the medium of the suspension system.

Referring to the drawings, it will be seen that the body 1 of the actuating device comprising the cylinder cooperating with the piston 14 is provided, at its bottom, with a boss 2 into which is drilled a bore 3, the axis of which is parallel to a chord of the disc circumference and which is located substantially in the plane of the disc.

In this bore is arranged a pin 4 which is fitted through the upper end of a link-shaped component 5 provided, at its lower end, with a bore 6 whose axis is parallel to that of the pin 4 and which is likewise located substantially in the plane of the disc. Through this bore 6 passes a pin 7 which is common both to the part 5 and to a non-rotating supporting part 8 integral with the stub axle 9.

Since the link 5 is able to swivel about the pin 7 and the body of the device about the pin 4, said body is held against the disc by the linings 11 and 12 and consequently follows any irregularities in the shape of the disc without causing parasite braking when these irregularities pass between the linings.

As the linings gradually wear out, the braking device as a whole moves towards the right in FIGURE 1 as that wear is taken up.

In cases where the disc has a conical deformation, the brake block immediately adapts itself to it by swivelling about the pins 4 and 7.

This aptitude of the brake block to follow deformations of the disc enables it to be positioned in a sector of the wheel in which the deformations are liable to be large without prejudice to braking efficiency, thereby leading to fresh advantages.

For example, the brake block can be fixed to the bottom part of the disc with a view to shortening as much as possible the chain of transmission of the braking stresses from the tire to the non-rotating support of the wheel.

Such a layout has the added advantage of causing the wheel bearings to function under optimum conditions, the load component of the bearings during braking being then perpendicular to the normal load component, whereas in the conventional layout, in which the brake block is located over a substantially horizontal radius of the disc, the component is either directed oppositely—in which case the bearings tend to unseat—or in the same direction, in which case the overload becomes too great.

The aptitude possessed by the block 1 to swivel can be used in conjunction with a simple mechanical brake control system. A lever 10 is rendered integral with the block 1; pulling is exerted at its extremity by a brake-cable 19 and it is restored to its initial position by a return spring 14 coaxial with the cable 19.

The pull on the cable causes the block 1 to swivel about the pin 4, whereupon the inner portion of the lining 12 bears against the inside of the disc and the outer portion of the lining 11 against the outside of the disc, due to the fact that the piston 14 is kept at the correct working clearance by means of a suitable device such as the irreversible screw system forming the object of Patent No.

2,949,173 of August 16, 1960 filed by the applicant in respect of an automatic device for adjusting disk brakes, irrespective of the force tending to separate the linings.

For in that particular arrangement, the piston 14, which is acted upon by fluid entering through inlet 1' in cylinder 1, is connected to a plunger 15 through the medium of a circlip 16 which leaves a degree of axial play equal to the working clearance between the two parts. The plunger 15 emerges from the body of the cylinder through a sleeve 17 which is driven into the cylinder, sealing being ensured by means of an O-ring 18. The end of the plunger embodies an irreversible trapezoidal thread which screws into the end of the sleeve 17 which forms the system's adjustment nut.

When the lining wears out to some extent, the piston 14 draws along the plunger 15 with it and the plunger rotates the sleeve 17 to the necessary extent.

On the return stroke, the piston is thrust back by the warp in the disc or by return springs (not shown), but then abuts against the plunger which is prevented from moving back. The play is thus taken up and, irrespective of the force to which the linings are subjected, the piston can move back only through the distance corresponding to the working clearance.

A description will now be given of a specific embodiment illustrated in FIGURES 3 through 6.

Referring now to these figures, it will be seen that the body 21 of the actuator comprising the cylinder with which cooperates the piston 34 is provided, at its bottom, with a boss 22 into which is drilled a bore 23 whose axis is parallel to a chord of the circumference of the disc 50 and which is situated substantially in the plane of the disc. Into this bore is inserted a pin 24 which connects the boss 22 to the upper part of the sole connecting member 25, which consists of a thick sheet-steel pressing of general U shape.

Figure 5:
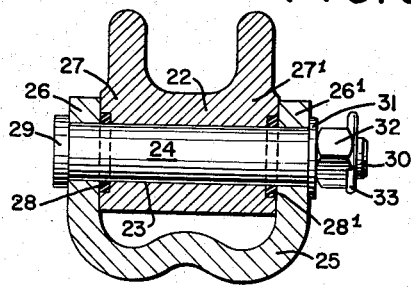
FIGURE 5 is a sectional view along the line V—V in FIGURE 4.
Figure 4:
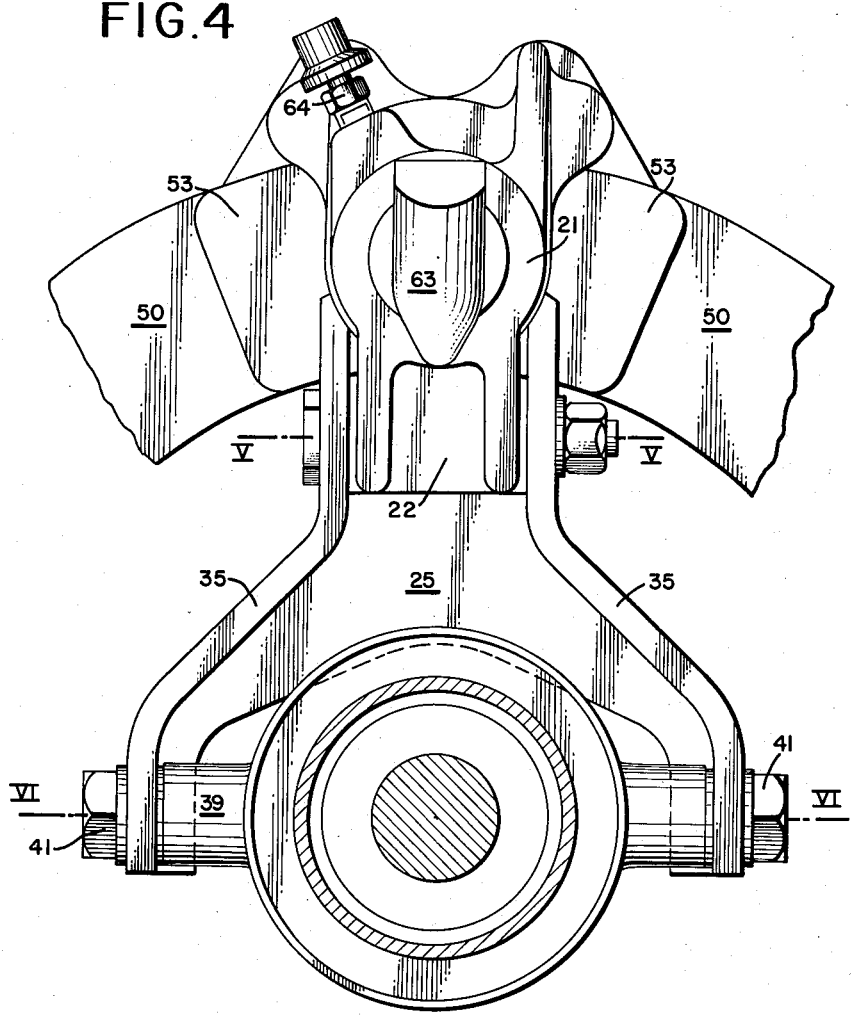
FIGURE 4 is a rear view thereof.
Figure 6:
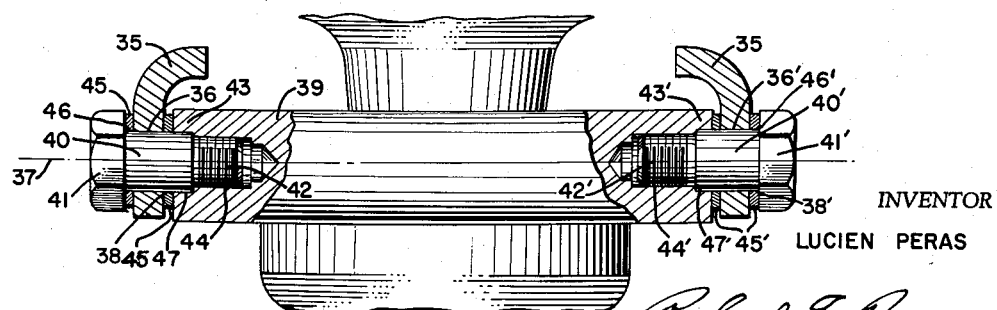
FIGURE 6 is a partial section view along the line VI—VI in FIGURE 4.

This connection is realized in the following manner: the upper portion of the connecting member comprises two plane faces 26 and $26_1$ which are applied against the corresponding faces 27 and $27_1$ of boss 22 cut perpendicular to the pin 24 (FIGURE 5). Two sealing rings 28 and $28_1$ provide a seal for the portion of the pin 24 located inside the boss 22 and serve also to damp vibrations of the block 21 on its support 25.

The pin 24 is also provided with a shoulder 29 and a threaded end 30 by means of which the faces 26 and $26_1$ are pressed against the faces 27 and $27_1$ through the medium of a washer 31 and a nut 32 locked by a pin 33.

The connecting member 25 is provided, at the bottom of its branches 35, with two drillings 36 and $36_1$ which are located along an axis 37 parallel to the pin 24 and which open onto two faces 38 and $38_1$ perpendicular to the pin.

The connection between the non-rotating support 39 of the wheel and the connecting member 25 is realized in the following manner:

The pins 40 and $40_1$, which comprise hexagon-headed bosses 41 and $41_1$ and threaded ends 42 and $42_1$ respectively, press the faces 38 and $38_1$ against parallel faces 43 and $43_1$ of the non-rotating support 39 of the wheel, the threaded ends 42 and $42_1$ of pins 40 and $40_1$ being screwed into taps 44 and $44_1$ made in the support 39 along the length of the axis 37.

Tightening is effected by the insertion, on either side of each face 38 and $38_1$ respectively, of washers 45 and $45_1$ provided at their centers with sealing elements 46 and $46_1$ to provide sealing of those portions of the pins 40 and $40_1$ which are located inside of the faces 38 and $38_1$.

Tightening action is limited by the length of the pins 40 and $40_1$, this length terminating, on the side of threaded portions 42 and $42_1$, in shoulders 47 and $47_1$ respectively, against which the pins are blocked in each case.

The upper portion of the connecting member 25 is further provided with an extension 48 onto which is fixed the inside shoe 52 located on the same side as the support of the disc 50 through the medium of a peg 51 inserted into the metallic portion of the brake shoe onto which is bonded the lining 49, said peg 51 being itself set into the end 48 of the connecting member 25.

The lining 49 is thus made to follow the displacements of the connecting member 25 and not those of the block 21.

The assembly of linings 53 located on the side remote from the disc support is capable of displacement along grooves 54 and 55 provided in the bosses 56 and 22 of the block 21; into these grooves engage pegs 57 and 58 provided on the metallic support 59 onto which are bonded the linings 53 on the other side of the disc.

The outer lining 60 located on the same side as the disc support is bonded directly onto a metal plate 61 which is screwed, by means of two screws 62 and $62_1$, onto the boss 56 of the block 21.

The actuation system further comprises a fluid supply system 63, located at the back of the block 21, and a draining system 64.

An arrangement for taking up the working clearance is provided in the following manner:

A tube 65 is set into the block 21 along the axis of the piston 34;

A spring 66 slides with friction over the outer surface of the tube 65; this spring is confined in a pressed sheet-steel cage 68 with a preset clearance 67 in the direction of the axis of the piston; this sheet-steel cage is driven into the inside of the piston 34.

The system is sealed by means of a seal 69 located in a groove 70 of the piston and a seal 71 whose lip 72 is able to unroll as the piston travels forward.

Operation of this brake is as follows:

When pressure is exerted, the piston 34 thrusts on the set of linings 53 located against it, so that these linings are applied against the disc; the reaction set up in the brake block is transmitted by the boss 56 to the lining 60, which is in turn applied against the opposite face of the disc, and by the pin 24 to the upper part of the connecting member 25, the latter dividing the reaction into two parts of which the greater is transmitted to the lining 49, which is consequently applied against the opposite face of the disc, while the smaller part is transmitted by the branches 35 of the member 25 to the pins 40 and $40_1$ which in turn transmit it to the non-rotating support of the wheel.

The ratio of these two forces is in this case about 1:4, so that there is a slight loss of efficiency which is evaluated at $$\frac{1}{5} \times \frac{1}{4} = \frac{1}{20}$$

or about 5%. Furthermore, the forces acting on the disc are not entirely cancelled out, for if F be the force exerted by the piston, the sum of the reactions transmitted by the linings 60 and 49 are $$\frac{F}{2}$$

for the former and $$\frac{F}{2} \times \frac{4}{5}$$

for the latter, so that the resultant force in the system is equal to $$\frac{F}{10}$$

and is directed towards the left in FIGURE 3. This force thrusts the disc towards the left of FIGURE 3.

In practice, the disc is capable of withstanding this parasite force and the theoretical reduction in efficiency is negligible.

Furthermore, as wear takes place on the linings, the block 21 is carried towards the right while the lining 49 on shoe 52 which is carried by the supporting lever 25 in actual fact pivots about the axis 37 and wear takes place with a degree of slant which in practice is negligible but which can be suppressed by allowing the metal brake shoe 52 to pivot slightly against the end 48 of the supporting lever 25, in which case the end 48 will offer a slightly rounded face in application against the shoe 52, a small clearance being then provided between the peg 51 and the shoe 52.

Excess working clearance is taken up in the following manner:

When the actuation pressure is exerted, the piston 34 moves leftwards and if the clearance 67 between the spring 66 and the cage 68 is sufficient, the spring will not move; if, however, wear has taken place in the linings, the clearance will be inadequate and the cage will thrust against the spring and cause it to slide with friction over the outer surface of the tube 65. If the brake is released, the assembly consisting of the linings 53 and the piston 34 with the cage cannot move back until the cage abuts via its face 73 against the spring 66, and since the latter has moved forward to a certain extent, the return action is reduced to the same extent and a small quantity of extra liquid remains in the actuating device.

In addition to the ease with which it can be produced, an essential attribute of this invention is the facility with which it enables the linings to be removed and replaced.

These operations are carried out as follows:

To remove the linings, the screws 62 and 62₁ retaining the lining 60 are unscrewed and the lining removed; the complete block 21 is then swivelled about the pin 24, thus enabling the set of linings 53 to be removed by sliding the pegs 57 and 58 along the grooves 54 and 55; next, the support 25 is swivelled to the left about the axis 37, thereby enabling the shoe 52 supporting the lining 49 to be disengaged from the peg 51 securing it to the end of the supporting lever 25.

The new linings are then fitted by reversing the order of operations after having forcefully thrust the piston 34 fully home into the cylinder of the block 21, thereby returning the spring 66 to its extreme position.

I claim:

1. In combination a braking device having an annular disc fixed by a support on one side to a wheel mounted for rotation on a non-rotating support, and having a hydraulically actuated control cylinder block defining a cylinder with a piston slidably mounted therein mounted adjacent the unsupported side of said disc, and having brake linings mounted and displaceable in said control cylinder block for engaging both said sides of the annular disc, said support for said annular disc having a vertical arm and a horizontal arm, said horizontal arm being connected at its end to said disc substantially midway between its peripheral edges, whereby the disc is spaced from but substantially parallel to the vertical arm of said support, and an improved means for supporting said control cylinder block comprising: a link pivotally supporting said control cylinder block on said non-rotating support, said link having oppositely disposed ends respectively formed with parallel bores extending in a direction normal to the longitudinal axis of said link, said bores in the oppositely disposed ends respectively registering with bores parallel to a chord of said annular disc and defined in said control cylinder block and in said non-rotating support approximately in the plane of said annular disc and articulation pins respectively fitting in said registering bores and pivotally securing said oppositely disposed link ends respectively to said control cylinder block and to said non-rotating support, thereby mounting said control cylinder block for automatically conforming to the plane of said annular disc.

2. In combination a braking device as defined in claim 1 further comprising swivelling means mounted on said control cylinder block for swivelling said control cylinder block about said articulation pins, thereby carrying out the mechanical operation of the brake independently of the hydraulic operation.

3. In a caliper brake having a brake disc secured by a support on one side to a wheel mounted for rotation on a non-rotating support, a pair of first brake linings positioned to bear against one face of said disc, said first brake linings comprising an inner brake lining and an outer brake lining, and a pair of second brake linings positioned to bear against the other face of said disc, a control cylinder block housing a portion of said disc and supporting said outer brake lining and containing actuating means for selectively moving said second linings toward said disc, said pair of second brake linings being slidably supported in said control cylinder block, and a link pivotally supporting said control cylinder block on said non-rotating support, and said link also supporting said inner brake lining.

4. A caliper brake as defined in claim 3, wherein said inner and outer brake linings are bonded to brake shoes, the shoe carrying said outer lining being removably connected to said cylinder control block, and the shoe carrying said inner lining being connected by means of a retaining peg on said link.

5. A disc brake as defined in claim 4, wherein said retaining peg is connected to the shoe supporting said inner lining with a slight clearance and the face of said link bearing against said shoe supporting the inner lining is slightly rounded.

6. A disc brake as defined in claim 4, further comprising a clearance-take-up device comprising an annular spring wound around a tubular part disposed along the axis of the control cylinder block and seated in the bottom thereof, and a cage integral with the piston surrounding said spring with a preselected clearance.

7. A caliper brake as defined in claim 3, wherein said outer lining is rigidly connected to said cylinder control block.

8. A caliper brake as defined in claim 3, wherein said link has oppositely disposed ends respectively formed with parallel bores extending in a direction normal to the longitudinal axis of said link, said bores in the oppositely disposed ends respectively registering with bores parallel to a chord of said annular disc and defined in said control cylinder block and in said non-rotating support approximately in the plane of said annular disc, and articulation pins respectively fitting in said registering bores and pivotally securing said oppositely disposed link ends respectively to said control cylinder block and to said non-rotating support, thereby mounting said control cylinder block for automatically conforming to the plane of said annular disc.

References Cited in the file of this patent

UNITED STATES PATENTS

| 1,619,542 | Riedinger | Mar. 1, 1927 |
| 2,533,186 | Bricker et al. | Dec. 5, 1950 |
| 2,713,400 | Coskun | July 19, 1955 |
| 2,921,651 | Myers | Jan. 19, 1960 |

FOREIGN PATENTS

| 730,053 | Great Britain | May 18, 1955 |
| 1,129,639 | France | Sept. 10, 1956 |
| 1,180,475 | France | Dec. 29, 1958 |